3,475,491
1,3-BIS[BIS-(DIFLUOROAMINO)
FLUOROMETHYL] UREA
Lawrence Elnathan Benjamin and Stanley Frank Stafiej, Stamford, Conn., assignors to American Cyanamid Company, Stamford, Maine, a corporation of Maine
No Drawing. Filed Mar. 14, 1967, Ser. No. 624,116
Int. Cl. C07c 127/16; C06c 1/00
U.S. Cl. 260—553            1 Claim

ABSTRACT OF THE DISCLOSURE

This invention relates to the compound 1,3-bis[bis-(difluoroamino)fluoromethyl] urea having utility as an oxidizer in rocket propellants.

CROSS-REFERENCE TO RELATED APPLICATIONS

The starting material, i.e. the bis(difluoroamino) fluoromethyl isocyanate, used to produce our novel compound may be produced as disclosed in copending U.S. application, Ser. No. 619,121, by Kuhn and entitled Compounds, which production generally comprises heating bis(difluoroamino)fluoromethyl carbamyl fluoride alone or in the presence of a weak base such as sodium acetate. Said bis(difluoroamino)fluoromethyl carbamyl fluoride and a method for its production is disclosed and claimed in U.S. application Ser. No. 619,123 by Kuhn and entitled Compounds.

BACKGROUND OF THE INVENTION

This invention relates to the art of nitrogen-fluorine compounds and, more particularly, nitrogen-fluorine urea compounds.

SUMMARY

We have discovered a novel compound which may be utilized as an ingredient in rocket propellant compositions. For example, the compound may be used as oxidizer in rocket propellants composed of a fuel such as aluminum, boron, magnesium, etc. and a resinous binder such as a polyurethane, a polyester, etc. Other materials such as the perchlorates, nitrates, etc. of alkali metals and alkaline earth metals such as sodium, potassium, etc. ammonia and the like may also be added. Further discussion of such compositions can be found in U.S. Patents Nos. 3,132,976; 3,132,978; 3,153,604; 3,171,764; 3,203,171; 3,214,305; 3,278,351, which patents are hereby incorporated herein by reference.

The use of other fluorine-nitrogen compounds for this purpose has been known in the art. Most other compounds, however, are either too friction sensitive or impact sensitive to be used commercially. The instant compound is less sensitive than known compounds and is more thermally stable, and therefore has a greater potential than those compounds known in the art.

DESCRIPTION OF THE INVENTION INCLUDING PREFERRED EMBODIMENTS

Our novel compound has the formula (I) 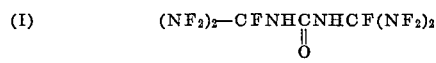

and is prepared by contacting at least 2 moles of bis(difluoroamino)fluoromethyl isocyanate with one mole of water. This reaction generates, in situ, bis(difluoroamino)fluoromethylamine. The amine then reacts with the remaining isocyanate, triphenyl phosphine oxide having been added, to produce a urea-phosphine oxide complex, which complex is then contacted with a strong acid to liberate the subject urea, i.e. according to the equations, (I) 

(II)
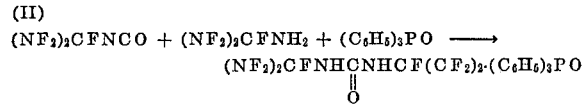

(III)
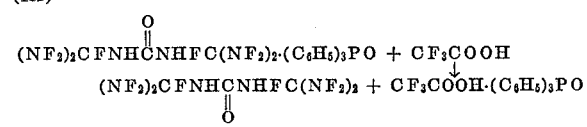

As mentioned above, when the isocyanate is reacted with water, the water is preferably used in one-half molar equivalents.

The amount of triphenylphosphine oxide which may be used to produce our novel compound should range from about 0.5–2.0 moles, per mole of isocyanate charged, The temperature of the reaction can range from about −20° C. to about 80° C., preferably 0° C. to 50° C., with atmospheric, subatmospheric or superatmospheric pressures being tolerable.

The process may be conducted in the presence or absence of a solvent. If a solvent is desired, such materials as benzene, toluene, xylene, methylene chloride, carbon tetrachloride, trichlorofluoromethane, and mixtures thereof may be used.

Displacement of the urea product from the triphenylphosphine oxide complex can be effected by contacting the complex with any material which will compete successfully with the urea to form a complex with the oxide. In addition to the trifluoroacetic acid mentioned above, trichloroacetic acid, $BF_3$, $SnCl_4$ and the like are examples of compounds which may be used.

The following example is set forth for purposes of illustration only and is not to be construed as limiting the instant invention except as set forth in the appended claims. All parts and percentages are by weight unless otherwise specified.

Example 1

Into a suitable flamed reaction vessel equipped with a valve and containing a magnetic stirring bar is added 1.0 part of triphenylphosphine oxide. 0.0689 part of water and 3.36 parts of benzene are then added and the vessel is attached to a vacuum line. The mixture is degassed and 1.36 parts of bis(difluoroamino)fluoromethyl isocyanate are added by vacuum transfer. The resultant mixture is allowed to warm to room temperature and is stirred for 41 hours. During this time, a small amount of white solid separates from the originally clear, colorless solution. The reaction mixture is cooled to −196° C. and then allowed to warm while all volatile materials are transferred to a second vessel. A white, solid residue is recovered in a yield of 100%, calculated as the triphenyl phosphine oxide complex. The solid complex is dissolved in 21.4 parts of benzene and transferred to a centrifuge tube. 3.56 parts of trifluoroacetic acid are added and a fine white, crystalline solid separates. The tube is cooled for 15 minutes and the solid product is recovered by centrifugation. The white product is washed with cold benzene and dried in a stream of nitrogen in a vacuum desiccator. The yield of 1,3-bis-[bis(difluoroamino)fluoromethyl] urea is 84% of theoretical.

We claim:
1. The compound 1,3 - bis[bis(difluoroamino)fluoromethyl] urea.

References Cited

UNITED STATES PATENTS 3,375,259   3/1968   Gibson et al. _____ 260—553

BERNARD HELFIN, Primary Examiner

M. W. GLYNN, Assistant Examiner

U.S. Cl. X.R.

149—109